United States Patent
Depauw et al.

(10) Patent No.: US 8,105,695 B2
(45) Date of Patent: Jan. 31, 2012

(54) LOW-EMISSIVITY GLAZING

(75) Inventors: Jean-Michel Depauw, Jumet (BE); Gaëtan Di Stefano, Jumet (BE)

(73) Assignee: AGC Glass Europe, Brussels (BE)

( * ) Notice: Subject to any disclaimer, the term of this patent is extended or adjusted under 35 U.S.C. 154(b) by 0 days.

(21) Appl. No.: 12/532,318

(22) PCT Filed: Mar. 17, 2008

(86) PCT No.: PCT/EP2008/053166
§ 371 (c)(1),
(2), (4) Date: Feb. 19, 2010

(87) PCT Pub. No.: WO2008/113786
PCT Pub. Date: Sep. 25, 2008

(65) Prior Publication Data
US 2010/0167034 A1    Jul. 1, 2010

(30) Foreign Application Priority Data
Mar. 19, 2007 (EP) .................... 07104429

(51) Int. Cl.
*B32B 15/00* (2006.01)

(52) U.S. Cl. ........ 428/432; 428/434; 428/698; 428/701; 428/702

(58) Field of Classification Search .............. 428/34, 428/655
See application file for complete search history.

(56) References Cited

U.S. PATENT DOCUMENTS

| | | | |
|---|---|---|---|
| 5,059,295 A * | 10/1991 | Finley | 204/192.27 |
| 5,110,637 A | 5/1992 | Ando et al. | |
| 6,210,784 B1 | 4/2001 | Rondeau et al. | |
| 2002/0136905 A1 * | 9/2002 | Medwick et al. | 428/432 |
| 2003/0180547 A1 * | 9/2003 | Buhay et al. | 428/434 |
| 2004/0241490 A1 * | 12/2004 | Finley | 428/655 |
| 2005/0208281 A1 | 9/2005 | Decroupet et al. | |
| 2007/0231501 A1 | 10/2007 | Finley | |
| 2008/0085404 A1 | 4/2008 | Novis et al. | |
| 2008/0187692 A1 | 8/2008 | Roquiny et al. | |
| 2009/0004412 A1 * | 1/2009 | Decroupet et al. | 428/34 |

FOREIGN PATENT DOCUMENTS

| | | |
|---|---|---|
| DE | 10 2005 039 707 | 3/2007 |
| EP | 0 331 201 | 9/1989 |
| EP | 0 995 724 | 4/2000 |
| EP | 1 538 131 | 6/2005 |
| EP | 1 630 142 | 3/2006 |
| WO | 2006 097513 | 9/2006 |
| WO | WO2006-097513 * | 9/2006 |

* cited by examiner

*Primary Examiner* — Timothy Speer
(74) *Attorney, Agent, or Firm* — Oblon, Spivak, McClelland, Maier & Neustadt, L.L.P.

(57) ABSTRACT

The present invention relates to a glazing coated with an assembly of thin layers using vacuum deposition, said glazing having reflective properties for infrared radiation, while retaining a high transmission in the visible range, and retaining its properties when subjected to a thermal treatment such as bending/toughening. The glazing comprises one or more silver-based layers and dielectric layers, of which at least one underlying dielectric layer in relation to at least one silver-based layer is a titanium oxide- or oxynitride-based layer such as TiMOx or TiMOxNy, in which M is a metal or a plurality of metals or silicon, wherein these metals or silicon are contained in sufficient atomic proportions to prevent a significant transformation of the crystallographic structure of the previously deposited titanium oxide-based layer under the action of the thermal treatment.

35 Claims, 2 Drawing Sheets

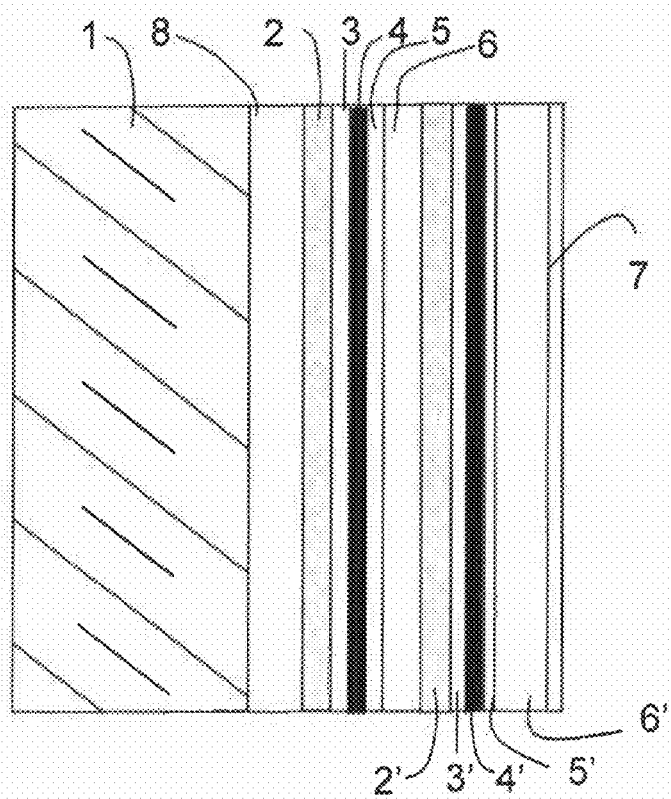

LOW-EMISSIVITY GLAZING

The present invention relates to low-emissivity glazing units; in other words, glazing units that reflect a very broad portion of the infrared rays and allow rays in the visible wavelength to pass through. More precisely, the invention relates to low-emissivity glazing units that retain or improve their opto-energetic characteristics when subjected to intense thermal treatment such as a thermal toughening and/or a bending operation.

Low-emissivity glazing units with a high light transmission are traditionally obtained by applying a thin metal layer, in particular a silver-based layer, onto a glass sheet, said layer being protected from the various changes possible by protective layers of dielectric type.

The layers are applied by a vacuum deposition technique such as "sputtering", wherein the material of the layers is obtained from targets is bombarded by ionised particles that detach elements from the target which then, possibly after reacting with the components of the atmosphere, are deposited onto the glass sheet that forms the substrate.

The traditional base structure where the arrangement has a single silver layer is as follows:

glass/dielectric I/Ag/barrier/dielectric II.

In this type of structure, the barrier layer is essentially provided to protect the metallic silver layer from possible degradation during application of the dielectric II layer. This is particularly the case when the latter is deposited using a so-called "reactive" technique, in which deposition is conducted using metal targets in an atmosphere that reacts with the deposited metal, in particular in an oxidising or nitriding atmosphere.

Dielectrics I and II have several functions. They are necessary to form an interferential filter that allows the reflection of the visible wavelengths to be reduced and consequently allows the light transmission to be increased. They are also used so that the reflected fraction in the visible results in as strong a colour neutrality as possible, and in particular so that the reflection does not result in purple tints in order to comply with client preferences in this regard. Moreover, the choice of dielectric layers or systems of dielectric layers is such that neutrality in reflection is obtained for the broadest range of angles of incidence in relation to the glazing.

Besides these purely optical functions, dielectric layers must lead far as possible to the formation of a metal layer in which the properties are optimised. For the same quantity of metal deposited, the layer can in fact result in a fairly high emissivity depending on the manner in which it is formed in contact with the dielectrics and in particular dielectric I. U.S. Pat. No. 5,110,662 instructs in this regard that the use of a zinc oxide layer of low thickness immediately below the metal layer allows the properties of the assembly to be substantially improved, particularly with respect to the emissivity. This improvement seems to result from the structure of this zinc layer that would provide a favourably uniform interface with the deposited metal layer, this benefiting the growth of the latter in a well controlled structure.

In the case of multiple applications, glazing units with the layer systems must be able to withstand thermal treatment such as bending/toughening. The layer systems can undergo changes in these treatments which subject the glazing units to temperatures that can reach and even exceed 600° C. for several minutes. Depending on the conditions, these changes can improve certain properties, in particular emissivity, by what seems to be a transformation of the crystalline structure of the silver-based layers. But this requires a very specific choice of the assemblies of layers. However, a degradation of one or several of the desired basic properties of these glazing units is generally observed, whether this relates to emissivity, colouration in reflection or even the appearance of a "haze", for example.

The systems used are the result of difficult selections with respect to the materials of the layers and their arrangement in these assemblies, since modifying a characteristic to improve a property is likely to have a negative effect on other properties.

Moreover, the requirements with respect to insulation performance are always high. While glazing units, toughenable or not, with an emissivity of less than 0.04 complied with regulations until recently, the most stringent regulations now require that glazing units have an emissivity that does not exceed 0.038, or according to the terms of these regulations, wherein the coefficient u for an insulating glazing composed of two 4 mm thick glass sheets, where the layer system is in position 3 and the space between the sheets is 90% argon and 10% dry air, is as follows:

$$u \leq 1.1 \text{ W/m}^2.$$

In order to achieve these thermal performances a known method used consists of increasing the thickness of the layer or layers of silver. By proceeding with this modification with the system remaining otherwise to unchanged, it is known that the neutrality of the colour in reflection is lost. The modified glazing units present a purple-coloured reflection.

To retain a certain neutrality in the interferential system formed by the layer system, it is known that the optical path corresponding to the layer located below the silver must simultaneously be increased. This procedure is not without effect on other properties, in particular light transmission or haze formation.

To obtain the best compromise between a favourable light transmission and a favourable neutrality, it is also known to use layers with a high refractive index below the silver of the layers to limit the increase in thickness of these dielectric layers and the disadvantages resulting therefrom.

Of the layers that meet this requirement, titanium oxide has the advantage, besides a relatively low cost, a favourable light transmission and high chemical stability. The use of titanium oxide layers can appear advantageous for this reason. This is effectively true when they are used in glazing units that are not subjected to thermal treatment subsequent to the formation of the layers. Therefore, in these glazing units the systems often have a reasonably thick layer of titanium oxide.

From testing the inventors have found that the insertion of a titanium layer among those located below the silver layer caused a degradation of the properties of this layer after the glazing had been subjected to a thermal treatment such as bending/toughening. This degradation has been found to occur even when the silver layer is not even in contact with the titanium layer.

Although the study of the mechanisms undertaken by the inventors has not been completed, it appears that this change is associated with a displacement in the structure of the system of layers initially deposited. The thermal treatment would result in a disturbance in the interface of the silver layer with the layers in contact with it.

This modification, which could result from that in adjoining layers, can also be caused indirectly by layers that are not in direct contact with the silver. The first case is the one, for example, in which a layer on which the silver sits has an irregular interface like that resulting from a columnar structure that is too pronounced. A structure of this type can be found, for example, in excessively thick zinc oxide layers, while in contrast, as indicated above, a layer of low thickness is very advantageous for the growth of a silver layer that has favourable properties.

It appears for reasons that have not been fully analysed that the presence of a titanium oxide layer, which necessarily has a certain thickness in order to play the role of anti-reflective layer in the interferential system, leads to a rearrangement of the structure of this system when it is subjected to thermal treatment such as bending/toughening.

It is known that titanium oxide is available in various structures depending on the conditions in which the layer is formed. Different factors have been identified in the conditions that influence the structure of this layer. The nature of the atmosphere in which the sputtering is conducted, in particular the concentration of oxygen of this atmosphere, plays a part. The speed with which deposition is achieved is another previously recognised factor. In every case studies of the nature of the layers show that titanium oxide is either amorphous or in the form of rutile or in the form of anatase or even, and this is in a substantial majority of cases, in the form of a mixture of these different forms.

It is also known that the conditions in which the layers are placed can lead to a progressive modification of their structure. The inventors have found that titanium oxide layers subjected to thermal treatments undergo modifications in their structure that appear to be the cause of the change in the properties of the layers located directly, or not directly, above them.

Therefore, an aim of the invention is to propose, in a system comprising at least one titanium oxide-based layer, means that will ensure that the structure of this layer remains essentially unchanged when it is subjected to a thermal treatment such as bending/toughening.

Another aim of the invention is to propose systems of layers comprising at least one silver-based layer, below which a titanium oxide- or oxynitride-based layer is located that has this property of substantially retaining its structure even when subjected to these treatments.

Another aim of the invention is to propose glazing units comprising to an assembly of layers, including at least one silver layer selectively reflective to infrared rays and de-reflective dielectric layers located above and below the silver layer, wherein at least one layer located below the silver is a titanium oxide-based layer having this property of substantially retaining its structure even when subjected to these treatments.

An aim of the invention is also to propose toughened and/or bent glazing units comprising the abovementioned systems of layers.

The inventors have shown that these aims could be achieved, at least partly, by forming layers based on titanium oxide or oxynitride of the type TiMOx or TiMOxNy, in which M is metal or several metals or silicon, wherein these metals or silicon are introduced in such quantities that they modify the structure of the layer to render it practically insensitive to thermal treatments such as bending/toughening.

Working from the finding that changes in crystalline structure resulting from the thermal treatments in question cause modifications, in particular at the interface of the layers, the inventors associate these modifications with the change in properties of the silver layers located above these titanium oxide-based layers.

Advantageously, the inventors also propose to choose the metal or metals or silicon included in the composition of the titanium oxide- or oxynitride-based layer dependent on their own contribution to the desired properties for the layer in question. In particular, according to the invention it is advantageous to use metals, the oxides or oxynitrides of which at the same time provide good transparency for wavelengths in the visible as well as a relatively high refractive index.

Besides silicon, of the metals combined with titanium in the titanium oxide-based layer, one or more metals of the group comprising: Zr, Ta, Nb, V, Nd, Ce, Hf, W, Mo, La, Al, Y can be advantageously used according to the invention.

Since the preferred metals are those with oxides that have the highest refractive index, Zr, Ta, Nb alone or in mixture, and most particularly Zr, are most favourably used. The choice of the additional metals is preferably such that the TiMOx oxides or TiMOxNy oxynitrides have a refractive index higher than 2.2 and advantageously higher than 2.3.

The metals or silicon in the titanium oxide- or oxynitride-based layers are advantageously introduced from metal or silicon targets, or ceramic targets corresponding to the desired compositions so that the deposit obtained effectively corresponds to an intimate mixture of the metal oxides or silicon that will oppose the formation of regular crystallographic structures of significant dimensions.

Deposition, particularly in the case of the oxides, is preferably conducted in an oxidising atmosphere. In the case of ceramic targets, the atmosphere can be neutral, in particular of argon, or slightly oxidising. In the case of metal or silicon targets, the atmosphere is oxidising.

The oxynitrides are deposited in an atmosphere containing nitrogen. As is known, titanium reacts more easily with oxygen than with nitrogen. For the formation of these oxynitrides, the proportion of nitrogen in the deposition atmosphere must be relatively significant. As an indication, if deposition is conducted on the basis of metal cathodes in an atmosphere simultaneously containing oxygen and nitrogen, the ratio of $N_2/O_2$ will advantageously be higher than 2 in order to have a significant quantity of nitrogen in the oxynitride. This proportion can amount to 3 or 4 to obtain a nitrogen content in the oxynitride of more than 10%.

The presence of nitrogen in the titanium oxynitride, like that of the additional metal or silicon, tends to make the structural transformation of titanium oxide during the thermal treatment more difficult. However, the nitrogen in the titanium oxynitride can cause the extinction coefficient of the layer to increase, in other words can cause the light transmission to decrease slightly and assist the formation of a haze. For these reasons, the presence of nitrogen must be properly controlled to optimise the properties.

In general, the presence of nitrogen in the modified titanium oxynitride does not usually exceed 30% in the $N_2/O_2$ ratio and preferably is less than 25%, particularly preferred less than 20%.

As the content of additional metal or silicon increases, the "disorder" in the structure of the titanium oxide also increases, and therefore the titanium oxide is less likely to form a changeable network under the action of thermal treatment such as bending/toughening. Conversely, the use of a high proportion of additional metals or silicon tends to reduce the refractive index of the assembly, as titanium oxide has the highest index.

In order to obtain a significant stabilising effect, the content of additional metal or silicon is at least 10 atom % in relation to the Ti in the mixture. It is preferably higher than 15% and particularly preferred higher than 20%.

In order to retain as far as possible the properties of the titanium oxide base of the layer, the atomic proportion of additional metal or silicon is preferably 60% at most and preferably does not exceed 50%.

For a significant modification in these optical paths, the thickness of the TiMOx or TiMOxNy layer is advantageously at least equal to 6 nm, preferably at least equal to 8 nm and particularly preferred at least equal to 10 nm.

It is advantageous according to the invention to deposit a zinc oxide-based layer of limited thickness below the silver-based layer or layers in addition to the TiMOx or TiMOxNy layers used according to the invention in order to benefit the formation of silver-based layers that lead to better properties, in particular with respect to electrical conduction or low emissivity. The zinc oxide-based layer benefits the growth of the silver-based layer in that its thickness remains such that it does not develop in columnar form.

The zinc oxide-based layer can include "doping" elements in low quantity. These elements are in particular Al, Sn or Mg. They are advantageously present in atomic quantity less than 15% and preferably less than 10%.

A particularly preferred layer is formed from a zinc oxide containing between 3% and 6% Sn.

The thickness of the zinc oxide-based layer is advantageously less than 10 nm and preferably less than 8 nm.

Traditionally, the silver-based layers are advantageously protected by a barrier or sacrificial layer. The role of this layer is principally to prevent degradation of the silver-based layer during the formation of the dielectric layers superposed on these silver-based layers. For this, the barrier layer is formed from a metal that reacts in the atmospheres likely to degrade the silver.

The most frequently used barrier layers are traditionally those that allow this type of protection and do not significantly reduce the optical properties of the assembly. Metal layers of very low thickness are used so as not to reduce the light transmission. Moreover, these layers are preferably used in conditions such that in the assembly formed they are transformed as far as possible into transparent dielectrics, the transformation occurring in particular during the reactive deposition of the layers located above these barrier layers.

Preferred metals and alloys for forming these barrier layers are in particular: Ti, Zn, Sn, Zr, Cr and NiCr. The preferred constituents are Ti and the NiCr alloys, and in the case of the latter alloys formed in proportions close to 80/20. Titanium-based barriers are preferred in that, once oxidised, they provide a very low light absorption. NiCr-based barriers have the advantage that their degree of oxidation can be controlled relatively precisely. These at least partially oxidised barriers are of the type TiOw (where $w \leq 2$) or NiCrOv.

Because of their respective advantages, a combination of Ti and NiCr alloy barriers is also particularly advantageous. The preferred choice is then to deposit the NiCr barrier in contact with the silver-based layer and superpose a Ti barrier onto it.

In every case the barrier or barriers preferably have a very low thickness. Together, they advantageously remain less than 10 nm and preferably less than 8 nm. Separately, each of the barrier layers has a thickness of not more than 6 nm.

The composition of the assembly of layers forming the interferential filter, intended in particular for control of the light transmission and neutrality of colour in particular in reflection, possibly includes additional dielectric layers located below the TiMOx or TiMOxNy layer or above this or even above and below this.

Included among the preferred additional dielectric layers in particular is at least one zinc oxide layer or a mixture of zinc and tin, aluminium or magnesium oxides in atomic proportions of Zn/Sn, Zn/Al, Zn/Mg in the range of between 30 and 70%.

The thickness of these additional layers is controlled in particular by that of the TiMOx or TiMOxNy layer to set the optical path at a satisfactory value to form the interferential filter corresponding to the thickness of the selected silver layer.

The layer assemblies according to the invention are notable for the quality of the silver layers that can be obtained because of them after the thermal treatment. For a given emissivity, this quality is expressed by the quantity of silver required to achieve this emissivity. The smaller this quantity is, the better the silver layer.

In the case of single silver-based layers, the content for the glazing units according to the invention advantageously lies between 80 and 160 mg/m$^2$, and preferably between 100 and 140 mg/m$^2$.

The glazing units according to the invention are advantageously such that after a thermal treatment at a temperature not less than 650° C. for a period of at least 3 minutes, the quality of the silver layer or layers is such that the product of the mass of silver per unit area expressed in mg/m$^2$ multiplied by the normal emissivity (Q×∈) is less than 5, preferably less than 4.8 and particularly preferred less than 4.6.

The invention is described in detail below with reference to the drawings, wherein:

FIG. 3 shows a glazing according to the invention comprising a layer assembly including two layers reflective of infrared rays.

Figure 1:
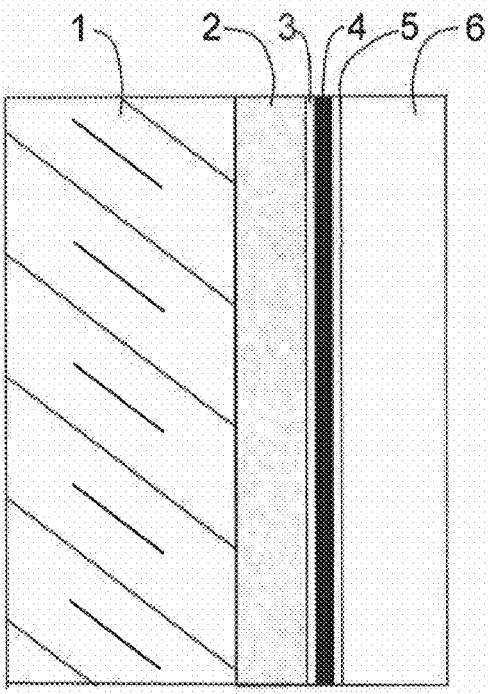
FIG. 1 shows a glazing according to the invention comprising a layer assembly including a layer reflective of infrared rays.

FIG. 1 is a schematic sectional view of a glass sheet 1 comprising a system of layers including a silver-based layer 4 reflective of infrared rays. The silver-based layer can be "doped", if necessary, with a metal that benefits its crystalline structure or its durability. As known, such a metal is palladium, platinum, nickel or silicon, for example.

On either side of the silver, dielectric layers form the interferential filter and protect the silver during the formation of the assembly and subsequently during the service life of the glazing.

According to the invention, at least one dielectric layer 2 is formed from a mixed oxide or mixed oxynitride of titanium and another metal or silicon of the type TiOx or TiOxNy.

When the assembly is subjected to an intense thermal treatment, the layer 4 located below the silver must substantially retain its structure in contrast to the behaviour of a similar traditional TiO$_2$-based layer.

A relatively thin zinc oxide-based layer 3 possibly containing a doping metal such as Zn, Al or Mg is advantageously deposited in direct contact with the silver-based layer. This layer benefits the growth of the structure of the silver-based layer. Since this layer 3 is relatively thin in comparison to the dielectric layers 2 or 6 providing the essential filter characteristics in combination with the silver-based layer, this layer 3 close to the silver-based layer does not obstruct the restructuring of the underlying layers when such changes occur in particular during a thermal treatment. To ensure that the silver-based layer is not changed, it is necessary according to an instruction of the invention that the layer 2 does not itself have any significant modification in its structure.

Traditionally, a barrier layer 5 of low thickness is arranged above the silver to prevent oxidation of the silver during deposition of subsequently deposited layers. In the represented case, the outermost dielectric layer is a thick layer 6 which completes the interferential filter.

Figure 2:
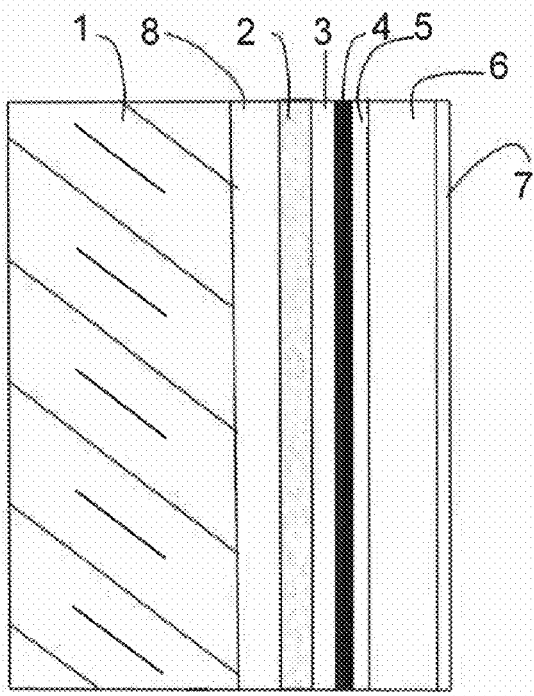
FIG. 2 shows a glazing according to the invention comprising another layer assembly including a layer reflective of infrared rays.

The structure shown in FIG. 2 is analogous to the above. The similar layers are given the same references as in FIG. 1. In addition to the previously described layers, this structure comprises a surface layer 7 and a second dielectric 8 placed in contact with the glass sheet 1.

Since the main quality of the dielectrics 6 is to assist in the formation of the interferential filter, the choice of these dielectrics is dependent on their optical properties: index, transparency etc. These dielectrics do not all have the mechanical properties that ensure a good resistance of the layer assembly in the application of glazing units. In particular, the layers are not always sufficiently resistant to scratches that may occur during storage or transport.

For this reason, it is known to protect the layer assembly by depositing on the surface very resistant layers that contribute very little to the optical properties. Preferred layers are made of titanium oxide, for example. The thickness of these layers is limited to what is expedient to provide the desired mechanical resistance.

The dielectric layer 8 contributes to the formation of the optical properties of the assembly. It is generally relatively thick. This layer also assists in protecting the assembly against the migration of ions from the glass sheet 1 made easier by the thermal treatment.

Traditional layers for this usage are zinc and tin mixed oxide layers in particular. These mixed oxides have the advantage of being relatively convenient to produce, and in addition to having favourable optical properties have a favourably homogeneous structure without the formation of columnar structures characteristic of zinc oxides in thick layers, for example.

The sequence of the layers is not necessarily that shown, i.e. a thick layer 8 with an index lower than that of the TiOMx- or TiOMxNy-based layer 2. The sequence of the layers can be reversed, for example, with layer 2 in contact with the glass and covered by layer 8.

Additional layers can also be included in the assembly. Working from the structure shown in FIG. 2, it is possible, for example, to add a layer between layer 2 and layer 3. This layer is of the same nature as layer 8, for example, but may also be different.

In the same way, layer 6 can be joined to another dielectric layer located above or below layer 6.

The barrier layer 5 can be single or can itself be composed of several layers. In particular, as indicated above, this can be an assembly comprising a first NiCr oxide layer and a titanium oxide layer.

FIG. 3 schematically shows a structure having two silver-based layers 4 and 4'. The use of double silver layers is well known in the prior art. Despite a higher cost because of the complexity introduced by the multiplicity of layers to be deposited, the presence of two silver layers enables the emissivity of the glazing units to be improved while also allowing the neutrality of colour in reflection to be better controlled.

For the same reasons, it is also possible to provide three silver layers. Beyond that the benefit of additional silver layers is generally of little significance in view of the complexity of the corresponding systems.

With respect to additional layers (2', 3', 4', 5', 6') as above, FIG. 3 shows an assembly comprising layers (2' and 3') that benefit the formation of a silver layer that has an appropriate structure to provide the best quality in particular in terms of conduction and emissivity, with one or more barrier layers (5') protecting the silver-based layer (4') from possible degradation during the deposition of the layers to be superposed on it and one or more dielectric layers (6') to complete the filter.

As indicated above with respect to FIG. 2, the sequence of layers with an essentially optical function can be changed, as can the number of layers used.

As a practical example of the invention, systems of layers with or without TiOMx or TiOMxNy oxide or oxynitride layers have been compared both for their emissivity and their neutrality in reflection.

COMPARATIVE EXAMPLE

The following system is used as basis for comparison, starting from the glass:

ZnSnO(50/50)/ZnSnO(90/10)/Ag/TiOw/ZnSnO(90/10)/ZnSnO(50/50)/TiO$_2$
280        80            120  50       80           235         60

The thicknesses of the layers are expressed in Angström for the dielectrics and in mg/m$^2$ for the silver.

The deposits are made in an oxidising atmosphere from metal targets for the dielectrics and in a neutral atmosphere (argon) for the silver layer and for the TiOw barrier layer.

Deposition of an assembly of similar layers proceeds by reducing the first layer ZnSnO (50/50) to 180 Angström and depositing a layer of 100 Angström onto this layer in a lightly oxidising atmosphere from a ceramic target made of titanium oxide. As a result, the structure of this system is:

ZnSnO(50/50)/TiO$_2$/(ZnSnO(90/10)/Ag/TiOw/ . . .
180           100    80           120    50

The systems are subjected to a thermal treatment at 650° C. for three minutes in a preheated oven and in an atmosphere of air. The measurements of normal emissivity, haze and colouration in reflection using the CIE-LAB system are indicated in the following table:

|  | Emissivity | Haze | L* | a* | b* |
|---|---|---|---|---|---|
| Reference | 0.040 | 4 | 42.62 | −0.65 | −8.08 |
| With TiO$_2$ | 0.073 | 4 | 42.94 | −1.23 | −6.32 |

These results show that the insertion of the TiO$_2$ layer under the silver causes a significant change in the emissivity of this layer (and therefore also in its electrical conduction). This change is attributed to the modification in the crystallographic nature of the TiO$_2$ layer when this is subjected to thermal treatment.

Example 1

According to the invention the procedure is the same, replacing the 100 Angström layer of TiO$_2$ with a layer of the same thickness made of a mixed oxide of titanium and zirconium. This layer is deposited in a lightly oxidising atmosphere from a ceramic target comprising, in percentage by weight, 50% of TiO, 46% of ZrO and 4% of YO. Thus, the resulting structure of the system is:

ZnSnO(50/50)/TiZrYOx/ZnSnO(90/10)/Ag/TiOw/ZnSnO(90/10)/ ...
180          100          80   120   50    80

The result of the test is given in the following table:

|         | Emissivity | Haze | L*    | a*  | b*   |
|---------|------------|------|-------|-----|------|
| TiZrYO (50% Zr) | 0.038 | 1.5 | 40.18 | 2.6 | −4.3 |

In contrast to the preceding example, the quality of the silver (Qx∈=4.56) in these conditions is not changed by the insertion of the high-index TiZrYO layer and the emissivity remains very low despite a relatively limited quantity of silver.

Example 2

A similar test is conducted, replacing the target used for deposition of mixed oxide of titanium and zirconium. The proportion of zirconium is brought down to 25% by weight with the proportion of titanium compensating this reduction. The results following the same test conditions are shown in the following table:

|         | Emissivity | Haze | L*    | a*   | b*    |
|---------|------------|------|-------|------|-------|
| TiZrYO (25% Zr) | 0.041 |      | 40.83 | 0.97 | −5.31 |

With the modified layer in lower proportions than above, it is additionally found that this layer with a high refractive index does not substantially change the quality of the emissivity when the glazing is subjected to the thermal treatment.

Example 3

A test analogous to that of Example 1 is conducted, and this time a titanium- and zirconium-based (50%) layer is deposited in a nitrogen atmosphere. Using the ceramic target, the deposit obtained in these conditions is an oxynitride with the oxygen of the target entering the composition of the layer for the most part.
The result of this test is as follows:

|         | Emissivity | Haze | L*    | a*  | b*   |
|---------|------------|------|-------|-----|------|
| TiZrYO (50% Zr) | 0.041 | 2 | 42.45 | 1.8 | −7.3 |

As above, it is found that the insertion of a layer of mixed Ti and Zr oxynitride shows good resistance to the thermal test. The quality of the silver layer is not substantially changed.

Example 4

In this test, the mixed oxide-based layer is also deposited in a nitrogen atmosphere. The ceramic target is formed from a mixture of titanium and silicon (8% by weight).

The results are shown in the following table:

|         | Emissivity | Haze | L*    | a*   | b*   |
|---------|------------|------|-------|------|------|
| TiSiO (8% Si) | 0.041 | 3.5 | 42.54 | 1.38 | −8.3 |

Example 5

The procedure is as in the preceding examples, but this time a 100 Å layer of titanium and niobium mixed oxide is used, while the other layers are as indicated above. The mixed oxide layer is deposited in a lightly oxidising atmosphere from a ceramic target of titanium oxide and the oxide $Nb_2O_5$ containing 30% by weight of $Nb_2O_5$.
The results are given in the following table:

|       | Emissivity | Haze | L*    | a*    | b*    |
|-------|------------|------|-------|-------|-------|
| TiNbO | 0.043      | 2.0  | 40.74 | −0.45 | −3.41 |

The layer of titanium and niobium mixed oxide, like that of titanium and zirconium, is very stable in the thermal test. The silver layer retains good properties and the colouration in reflection is very neutral.

Example 6

Two complementary tests are conducted with the same mixed oxides of titanium and niobium, but without any zinc oxide-based layer under the silver. The first system is composed in the following manner, starting from the glass:

ZnSnO(50/50)/TiNbOx/Ag/TiOx/ZnSnO(90/10)/ZnSnO(50/50)/TiO2
250          100     120 50   80              235             60

The second system has the same composition, but the layer of titanium and niobium mixed oxide has a thickness of only 80 Å instead of 100 Å.
The results are shown in the following table:

| TiNbo | Emissivity | Haze | L*    | a*    | b*    |
|-------|------------|------|-------|-------|-------|
| (a)   | 0.042      | 2.0  | 40.74 | −0.5  | −4.72 |
| (b)   | 0.041      | 2.0  | 41.22 | −0.49 | −6.16 |

As these results show, in the example in question the presence of the zinc-oxide based layer below the silver can be omitted without the thermal treatment substantially affecting the performance of the silver layer or the characteristics of colouration in reflection.

The invention claimed is:
1. A glazing unit comprising an assembly of thin layers obtained by a vacuum deposition technique, said assembly of thin layers comprising:
   a substrate;
   a first silver-based layer;
   a titanium oxide- or oxynitride-based dielectric layer of $TiMO_x$ or $TiMO_xN_y$ underlying the first silver-based layer where M is selected from one or more of the group consisting of Zr, Nb, Hf, Ta, Nd, V, Ce, W, Mo, La, and Y, wherein an atomic proportion of M in association with the titanium in the titanium oxide- or oxynitride-based layer, M/Ti, is not less than 0.1, and wherein the assembly of thin layers does not comprise any layers of $TiO_x$ between the substrate and the first silver layer.

2. The glazing unit according to claim 1, wherein the titanium oxide- or oxynitride-based layer is a titanium oxynitride-based layer and nitrogen is not higher than 30% of a $N_2/O_2$ ratio in the titanium oxynitride-based layer.

3. The glazing unit according to claim 1, wherein the titanium oxide- or oxynitride-based layer has a thickness of not less than 8 nm.

4. The glazing unit according to claim 1, wherein the titanium oxide- or oxynitride-based layer has a refractive index higher than 2.2.

5. The glazing unit according to claim 1, wherein a zinc oxide-based layer with a thickness at most equal to 10 nm is located below the first silver-based layer and in contact therewith.

6. The glazing unit according to claim 5, wherein the zinc oxide-based layer is a layer selected from the group consisting of ZnO, $ZnAlO_z$, $ZnSnO_z$ and $ZnMgO_z$, in which the atomic proportion of Al/Zn, Sn/Zn or Mg/Zn is not higher than 0.15.

7. The glazing unit according to claim 1, wherein the first silver-based layer is covered by at least one $TiO_w$, titanium-based barrier layer with $w \leq 2$, or an $NiCrO_v$ layer or both.

8. The glazing unit according to claim 7, wherein each of the $TiO_w$ and $NiCrO_v$ layers individually has a thickness of not more than 6 nm, and if both the $TiO_w$ layer and the $NiCrO_v$ layer are present they have a combined thickness of not more than 10 nm.

9. The glazing unit according to claim 1, wherein the assembly of thin layers has a single silver-based layer in a quantity in the range of between 80 and 160 mg/m².

10. The glazing unit according to claim 9, wherein after a thermal treatment at a temperature higher than 650° C. and for a period of at least 3 minutes, the quality of the silver-based layer or layers is such that $$Q \times \in < 5.0$$

wherein Q is expressed in mg/m² and $\in$ is the normal emissivity.

11. The glazing unit according to claim 1, comprising a layer assembly:
glass/$TiMO_x$ or $TiMO_xNy$/ZnO or $ZnAlO_z$ or $ZnSnO_z$ or $ZnMgO_z$/Ag/barrier/dielectric II.

12. The glazing unit according to claim 11 additionally comprising one or more dielectric layers located between the glass and the $TiMO_x$ or $TiMO_xN_y$ layer and/or above this layer below the ZnO or $ZnAlO_z$ or $ZnSnO_z$ or $ZnMgO_z$ layer.

13. The glazing unit according to claim 12, comprising one of the following structures:
(1) glass/dielectric/$TiMO_x$ or $TiMO_xN_y$/ZnO or $ZnAlO_z$ or $ZnSnO_z$ or $ZnMgO_z$/Ag/barrier/dielectric II,
(2) glass/$TiMO_x$ or $TiMO_xN_y$/dielectric/ZnO or $ZnAlO_z$ or $ZnSnO_z$ or $ZnMgO_z$/Ag/barrier/dielectric II, and
(3) glass/dielectric/$TiMO_x$ or $TiMO_xN_y$/dielectric/ZnO or $ZnAlO_z$ or $ZnSnO_z$ or $ZnMgO_z$/Ag/barrier/dielectric II, wherein the dielectric layers for the structure (3) are identical or different.

14. The glazing unit according to claim 13, wherein the dielectric layers comprise at least one zinc and tin mixed oxide-based layer with atomic proportion of Zn/Sn in the range of between 30 and 70%.

15. The glazing unit according to claim 14, wherein in addition to the $TiMO_x$ or $TiMO_xN_y$ layer one or more additional dielectric layers (dielectric III) are located above and/or below this $TiMO_x$ or $TiMO_xN_y$ layer.

16. The glazing unit according to claim 1, comprising at least two silver-based layers, each of these layers having at least one underlying assembly of layers of $TiMO_x$ or $TiMO_xN_y$/ZnO, $ZnAlO_z$, $ZnSnO_z$, or $ZnMgO_z$.

17. The glazing according to claim 1, wherein the assembly of thin layers has a reflective property for infrared radiation and a high transmission in the visible range.

18. The glazing according to claim 1, wherein properties of the assembly of thin layers are not substantially changed when the glazing unit is subjected to a thermal treatment.

19. The glazing according to claim 1, wherein the metal or metals are in sufficient atomic proportions to prevent a significant transformation of a crystallographic structure of the previously deposited titanium oxide-based layer under a thermal treatment.

20. The glazing according to claim 1, wherein the assembly of thin layers has been heated to a temperature of 600° C. or more.

21. The glazing according to claim 1, wherein the atomic proportion of M in association with the titanium in the titanium oxide- or oxynitride-based layer, M/Ti, is not less than 0.15, and wherein if the titanium oxide- or oxynitride-based layer is a titanium oxynitride-based layer nitrogen is not higher than 25% of the $N_2/O_2$ ratio in the titanium oxynitride-based layer.

22. The glazing according to claim 1, wherein the atomic proportion of M in association with the titanium in the titanium oxide- or oxynitride-based layer, M/Ti, is not less than 0.2, and wherein if the titanium oxide- or oxynitride-based layer is a titanium oxynitride-based layer nitrogen is not higher than 20% of the $N_2/O_2$ ratio in the titanium oxynitride-based layer.

23. The glazing according to claim 1, wherein M is selected from one or more of the group consisting of Zr, Nb, and Hf.

24. The glazing according to claim 1, wherein the first silver layer is a closest silver layer to the substrate.

25. A glazing unit having an assembly of thin layers comprising:
glass/$TiMO_x$ or $TiMO_xNy$/ZnO or ZnAlO or $ZnSnO_z$ or $ZnMgO_z$/Ag/barrier/dielectric II,
wherein the $TiMO_x$ or $TiMO_xN_y$ is a dielectric layer where M is selected from one or more of the group consisting of Zr, Nb, Hf, Ta, Nd, V, Ce, W, Mo, La, Y, Al, and silicon,
wherein an atomic proportion of M in association with the titanium in the titanium oxide- or oxynitride-based layer, M/Ti, is not less than 0.1,
wherein the assembly of thin layers does not comprise any layers of $TiO_x$ between the substrate and the first silver layer, and
wherein the ZnO or $ZnAlO_z$ or $ZnSnO_z$ or $ZnMgO_z$ layer is in direct contact with the Ag layer and the Ag layer is a closest Ag layer to the glass.

26. The glazing unit according to claim 25 further comprising one or more dielectric layers located between the glass and the $TiMO_x$ or $TiMO_xN_y$ layer and/or above this layer and below the ZnO or $ZnAlO_z$ or $ZnSnO_z$ or $ZnMgO_z$ layer.

27. The glazing unit according to claim 26, comprising one of the following structures:
(1) glass/dielectric/$TiMO_x$ or $TiMO_xN_y$/ZnO or $ZnAlO_z$ or $ZnSnO_z$ or $ZnMgO_z$/Ag/barrier/dielectric II, (2) glass/TiMO$_x$ or TiMO$_x$N$_y$/dielectric/ZnO or ZnAlO$_z$ or ZnSnO$_z$ or ZnMgO$_z$/Ag/barrier/dielectric II, and (3) glass/dielectric/TiMO$_x$ or TiMO$_x$N$_y$/dielectric/ZnO or ZnAlO$_z$ or ZnSnO$_z$ or ZnMgO$_z$/Ag/barrier/dielectric II, wherein the dielectric layers for the structure (3) are identical or different.

28. The glazing unit according to claim 27, wherein the dielectric or dielectric II layer comprises at least one zinc and tin mixed oxide-based layer with an atomic proportion of Zn/Sn in the range of between 30 and 70%.

29. The glazing unit according to claim 25, wherein after a thermal treatment at a temperature higher than 650° C. and for a period of at least 3 minutes, the quality of the Ag layer or layers is such that $$Q \times \in < 5.0$$

wherein Q is expressed in mg/m$^2$ and $\in$ is the normal emissivity.

30. The glazing unit according to claim 25, wherein titanium oxide- or oxynitride-based layer is a titanium oxynitride-based layer and nitrogen is not higher than 30% in the N$_2$/O$_2$ ratio in the titanium oxynitride-based layer.

31. The glazing according to claim 25, wherein the metal or metals or silicon are in sufficient atomic proportions to prevent a significant transformation of a crystallographic structure of the previously deposited titanium oxide-based layer under a thermal treatment.

32. The glazing according to claim 25, wherein M is selected from one or more of the group consisting of Zr, Nb, and Ta.

33. The glazing unit according to claim 25, wherein the titanium oxide- or oxynitride-based layer has a thickness of not less than 8 nm.

34. A glazing unit comprising an assembly of thin layers obtained by a vacuum deposition technique, said assembly of thin layers comprising:
a substrate;
a first silver-based layer;
a titanium oxide- or oxynitride-based dielectric layer of TiMO$_x$ or TiMO$_x$N$_y$ underlying the first silver-based layer where M is selected from one or more of the group consisting of Zr, Nb, Hf, Ta, Nd, V, Ce, W, Mo, La, Y, Al, and silicon,
wherein an atomic proportion of M in association with the titanium in the titanium oxide- or oxynitride-based layer, M/Ti, is not less than 0.1, and
wherein the assembly of thin layers does not comprise any layers of TiO$_x$ between the substrate and the first silver layer, and
wherein the titanium oxide- or oxynitride-based layer has a thickness of not less than 8 nm.

35. The glazing according to claim 34, wherein M is selected from one or more of the group consisting of Zr, Nb, and Ta.

* * * * *